D. E. VIRTUE.
COMBINED CHURN AND BUTTER WORKER.
APPLICATION FILED APR. 11, 1910.

979,610.

Patented Dec. 27, 1910.
2 SHEETS—SHEET 1.

Witnesses
Alice V. Swanson
A. H. Opvahl

Inventor
D. E. Virtue
By His Attorneys
Williamson & Merchant

D. E. VIRTUE.
COMBINED CHURN AND BUTTER WORKER.
APPLICATION FILED APR. 11, 1910.

979,610.

Patented Dec. 27, 1910.
2 SHEETS—SHEET 2.

Witnesses
Alice V. Swanson
A. H. Opsahl

Inventor
D. E. Virtue
By His Attorneys
Williamson & Merchant

UNITED STATES PATENT OFFICE.

DENNIS E. VIRTUE, OF OWATONNA, MINNESOTA.

COMBINED CHURN AND BUTTER-WORKER.

979,610. Specification of Letters Patent. Patented Dec. 27, 1910.

Application filed April 11, 1910. Serial No. 554,640.

*To all whom it may concern:*

Be it known that I, DENNIS E. VIRTUE, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My invention relates particularly to combined churns and butter workers of the type wherein horizontally disposed rotary drums are employed, and has for its object to improve the construction and action of machines of this character.

In the accompanying drawings, which illustrate the invention, like characters indicate like parts throughout the several views.

Figure 2:
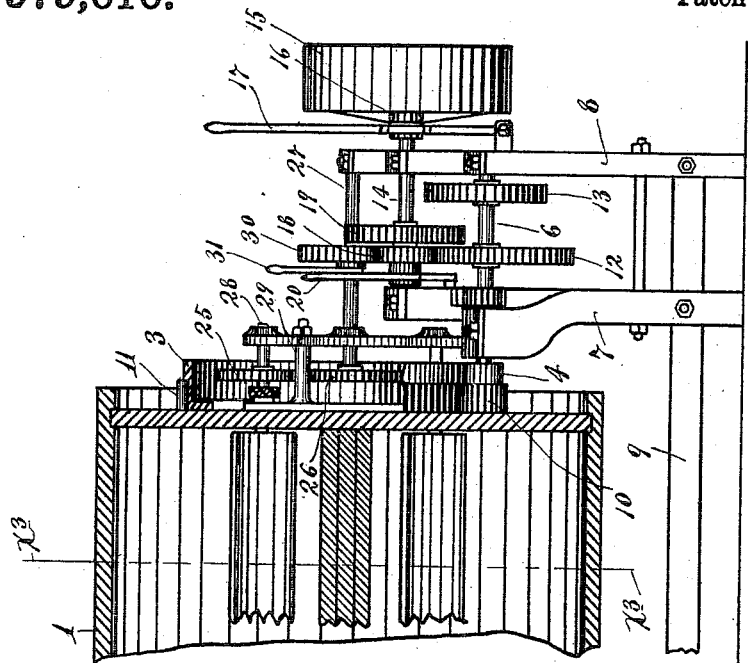
Figure 1:
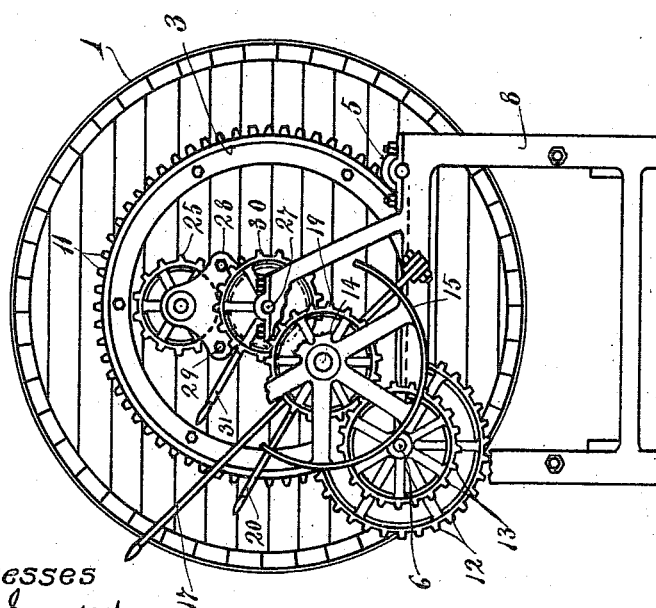
Figure 3:
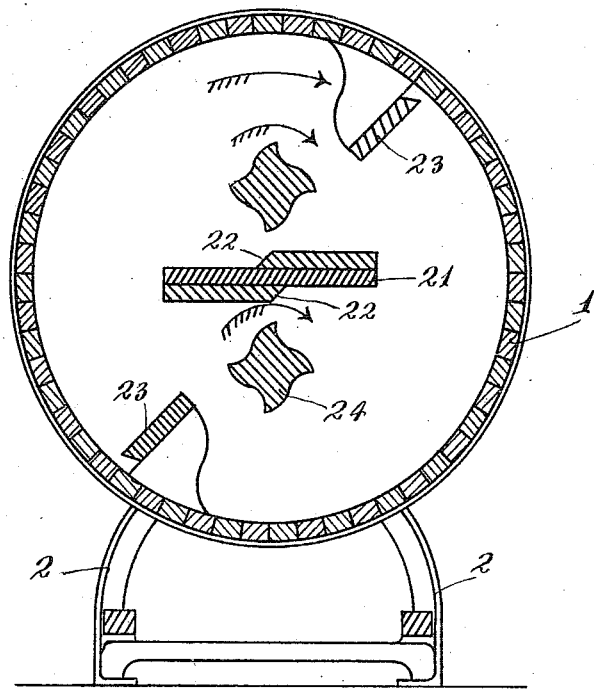

Referring to the drawings: Figure 1 is a front end elevation, showing the improved combined churn and butter worker; Fig. 2 is a view partly in side elevation and partly in vertical section, showing the front end portion of the drum and the two speed driving gear mechanism therefor, and, Fig. 3 is the transverse section taken approximately on the line $X^3 X^3$ of Fig. 2.

The rotary drum 1 is preferably a wooden drum and at its rear end it is journaled to a bearing pedestal 2 in any suitable way, while at its front end it is provided with a large bearing ring 3 that rests upon supporting rollers 4 and 5. The supporting roller 4 is secured to a counter shaft 6, journaled in suitable bearings on pedestal brackets 7 and 8 and rigidly tied together and to the rear pedestal 2, as shown, by tie bars 9. The roller 4 is, also, rigidly secured to a driving pinion 10 that meshes with external gear teeth 11, formed on the bearing ring 3 adjacent to the drum head to which the said ring is rigidly secured. The roller 5 is an idle roller, which simply coöperates with the roller 4 and the bearing ring 3, to rotatively support the front end of the drum, and it is journaled directly to the bearing pedestal 7. If desired the rear end of the drum may be supported by bearing rollers and a coöperating bearing ring on the rear drum head.

The counter shaft 6 carries two spur gears 12 and 13, the former of which is of much larger diameter than the latter. Extending parallel to the counter shaft 6, above and at one side thereof and journaled in pedestals 7 and 8, is a driving shaft 14, provided with a driving pulley 15, adapted to be connected thereto by a friction clutch 16 that is subject to a shipper lever 17. Mounted to slide on the driving shaft 14, but held to rotate therewith, by a key or other well known device, is a pair of rigidly connected spur gears 18 and 19, the former of which is much smaller than the latter. These two gears have a projecting grooved hub that is connected in a well known way to a shipper lever 20.

In Fig. 2 the gear 18 is shown as meshed with the large gear 12 so that the drum will be driven at a relatively slow speed, as required in the butter working mesh. When, however, the gear 19 is moved in mesh with the gear 13, the drum will be driven at a relatively high speed, as required in the churning action.

Extending axially within the drum and secured to the heads thereof is a centrally located so-called working partition 21, which for important reasons is provided with off-sets 22, in the vicinity of its transverse center. At diametrically opposite points the drum is provided with inwardly extended lifting flights 23 that extend radially in respect to the axes of the drum, at an angle of approximately 45 degrees to the face of the partition 21.

Working between the inner edge of each flight 23 and the central portion of the working partition 21 is a corrugated working roller 24. These two working rollers are, therefore, located one on each side of the working partition and in a plane which intersects the axes thereof and extends approximately at an angle of 90 degrees to the said working partition. The said working rollers will be driven in the direction of the arrows marked adjacent thereto in Fig. 3 when the drum is rotated in the direction of the arrows marked thereon on the same view.

The roller shafts are extended through the front head of the drum and preferably through suitable stuffing boxes and are provided with spur gears 25 on their projecting ends. These gears 25 mesh with a central gear 26, carried by the end of the counter shaft 27 mounted in suitable bearings on the pedestal 8 and in a bearing plate 28. This bearing plate 28 is, as shown, rigidly secured to the front head of the drum by projecting posts 29 and the said plate, also, affords further bearing for the outer ends of the shafts of the two rollers 24.

Mounted to slide on the shafts 27 but held to rotate therewith by key or other well known device for the purpose, is a spur gear 30, which is subject to the shipper lever 31 or any suitable construction or arrangement.

In the butter working action, the drum will be driven at the slow speed, as already stated and hence the gears 18 and 12 will be engaged and at this same time the rollers 24 should be positively driven and hence the gear 30 is slid into mesh with the said gear 18. Under these conditions, the drum and rollers will, as stated, be driven in the direction of the arrows marked on Fig. 3. The flights 23 will in succession pick up the butter from the bottom of the drum and raise the same to a point where the butter will be slid or rolled on to the upwardly moving roller and against the adjacent upper portion of the working partition 21; and the roller will work the butter against the said partition and thence downward to the bottom of the drum. The corrugations of the roller will have a tendency to cut the butter into long bars or strips, which immediately after they have passed below the offset 23 will find such increased clearances that they will quickly drop to the bottom of the drum. With this arrangement, the butter working action will be continuous, inasmuch as the one lifting flight 24 will begin to pick up butter as soon as or before the butter lifted by the other flight has been entirely delivered back to the bottom of the drum.

In collecting the butter after it has been properly worked, it is desirable to throw the rollers out of action; and this can be readily done by sliding the gear 30 out of mesh with the gear 18.

In the churning action it is not necessary to rotate the rollers, but the drum should be rotated at a higher speed than in the butter working action, and this, as already stated, may be done by sliding the gear 19 into mesh with the gear 13.

What I claim is:

1. In a machine of the kind described, the combination with a horizontal rotary drum, of a central working partition, working rollers carried by said drum, one on each side of said partition, and lifting flights for delivering the butter to said rollers.

2. In a machine of the kind described, the combination with a horizontal rotary drum, of a central working partition secured to the drum heads, working rollers carried by said drum, one on each side of said working partition, lifting flights, also, one on each side of said partition, for delivering the butter to said working rollers, and means for rotating said drum and rollers in the same direction whereby the butter will be worked downward between the upwardly moving working roller and said partition.

3. In a machine of the kind described, the combination with a horizontal rotary drum, of a central working partition secured to the heads of said drum and extended diametrically thereof, working rollers carried by said drum, adjacent to and one on each side of the central portion of said working partition, and lifting flights extended radially inward from the shell of the drum, at an oblique angle to said partition and approximately tangential to the coöperating working rollers.

4. In a machine of the kind described, the combination with a horizontal rotary drum, of a central working partition secured to the heads of said drum and provided on its opposite faces with reverse offsets in the vicinity of the axes of the drum, working rollers carried by said drum, located one on each side of said partition and coöperating with the offset portions of said partition, lifting flights extending inward from the shell of the drum for delivering butter to said rollers, and means for rotating said drum and rollers in the same direction, substantially as described.

5. In a machine of the kind described, the combination with a horizontal rotary drum provided at one end with a bearing ring having smooth and toothed portions of a counter shaft having a pinion meshing with the toothed portion of said ring and provided with a roller engaging the smooth portion of said ring, a second roller engaged with the smooth portion of said bearing ring and coöperating with the other roller to rotatively support that end of the drum and a two speed driving gear mechanism operative on said counter shaft.

6. In a machine of the kind described, the combination with a horizontal rotary drum, rotatively supported at one end by bearing ring on the drum head and coöperating local supporting rollers of a two speed driving gear mechanism for rotating said drum, a working roller in said drum having a projecting shaft and a gear on the projecting end of said shaft, a counter shaft having the gear meshing with the gear of said roller shaft, and another gear on said counter shaft, adapted to be engaged at will, with one of the gears of said two speed driving gear mechanism, substantially as described.

In testimony whereof I affix my signature in presence of two witnesses.

DENNIS E. VIRTUE.

Witnesses:
HARLAN E. LEACH,
CHAS. I. REIGARD.